United States Patent
Owen et al.

(10) Patent No.: US 12,292,993 B2
(45) Date of Patent: May 6, 2025

(54) GENERATING A DATA WAREHOUSE INDEX

(71) Applicant: SIGMA COMPUTING, INC., San Francisco, CA (US)

(72) Inventors: Gregory G. Owen, San Bruno, CA (US); Stipo Josipovic, San Francisco, CA (US); Donald Huang, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 302 days.

(21) Appl. No.: 17/462,450

(22) Filed: Aug. 31, 2021

(65) Prior Publication Data

US 2022/0067010 A1    Mar. 3, 2022

Related U.S. Application Data

(60) Provisional application No. 63/073,291, filed on Sep. 1, 2020.

(51) Int. Cl.
*G06F 21/62* (2013.01)
*G06F 16/22* (2019.01)
(Continued)

(52) U.S. Cl.
CPC ...... *G06F 21/6227* (2013.01); *G06F 16/2228* (2019.01); *G06F 16/242* (2019.01);
(Continued)

(58) Field of Classification Search
CPC ............. G06F 21/6227; G06F 16/2228; G06F 16/242; G06F 16/254; G06F 21/6218;
(Continued)

(56) References Cited

U.S. PATENT DOCUMENTS 7,711,750 B1 * 5/2010 Dutta .................. G06F 21/6227
707/999.009
10,339,337 B1 * 7/2019 Snelson .............. G06F 16/2228
(Continued)

OTHER PUBLICATIONS

Pengrui, Cen; LingDa, Wu; Chao, Yang; Ronghuan, Yu; "A hierarchical Access Control model of software repository based on RBAC," 7th IEEE International Conference on Software Engineering and Service Science (ICSESS), Beijing, 2016, pp. 761-765.*

(Continued)

*Primary Examiner* — Victor Lesniewski

(57) ABSTRACT

The present invention relates to methods, apparatus, and products for generating a data warehouse index. Generating a data warehouse index includes storing a refresh token for a user and obtaining, automatically without user interaction, an access token for the user from an identity provider. Subsequently, one or more queries are submitted to a data warehouse requesting connection information for data structures of the data warehouse accessible by the user. During the query submission, the access token for authorization of the user is provided to the data warehouse. One or more responses are then received from the data warehouse specifying connection information for data structures of the data warehouse accessible by the user. Finally, an index of the data warehouse for the user based on the received connection information for data structures of the data warehouse accessible by the user.

17 Claims, 4 Drawing Sheets

(51) Int. Cl.
*G06F 16/242* (2019.01)
*G06F 16/25* (2019.01)
*H04L 9/32* (2006.01)
*H04L 9/40* (2022.01)
*G06Q 10/105* (2023.01)

(52) U.S. Cl.
CPC ........ *G06F 16/254* (2019.01); *G06F 21/6218* (2013.01); *H04L 9/3213* (2013.01); *H04L 63/0807* (2013.01); *H04L 63/104* (2013.01); *H04L 63/105* (2013.01); *G06Q 10/105* (2013.01)

(58) Field of Classification Search
CPC . H04L 9/3213; H04L 63/0807; H04L 63/104; H04L 63/105
See application file for complete search history.

(56) References Cited

U.S. PATENT DOCUMENTS

| | | | | |
|---|---|---|---|---|
| 10,972,453 | B1* | 4/2021 | Natarajan | H04L 63/0807 |
| 2004/0215611 | A1* | 10/2004 | Jawa | G06F 16/40 |
| 2006/0059567 | A1* | 3/2006 | Bird | G06F 12/1466 726/28 |
| 2006/0265385 | A1* | 11/2006 | Agrawal | G06F 16/256 |
| 2008/0022370 | A1* | 1/2008 | Beedubail | H04L 63/101 726/4 |
| 2011/0167256 | A1* | 7/2011 | Lee | H04L 63/104 713/155 |
| 2011/0302180 | A1* | 12/2011 | Muller | G06F 16/284 707/754 |
| 2012/0330925 | A1* | 12/2012 | Ramamurthy | G06F 16/24534 707/718 |
| 2013/0054968 | A1 | 2/2013 | Gupta | |
| 2013/0117313 | A1* | 5/2013 | Miao | G06F 21/6245 707/E17.005 |
| 2014/0090081 | A1* | 3/2014 | Mattsson | G06F 21/6227 726/27 |
| 2015/0089570 | A1 | 3/2015 | Sondhi et al. | |
| 2016/0140178 | A1* | 5/2016 | Sirohi | G06F 16/24542 707/718 |
| 2016/0188898 | A1* | 6/2016 | Karinta | G06F 11/1471 726/4 |
| 2017/0154166 | A1* | 6/2017 | Klein | G06F 21/6245 |
| 2018/0075250 | A1* | 3/2018 | Chasman | G06F 21/6227 |
| 2018/0081668 | A1* | 3/2018 | Eberlein | H04L 63/0807 |
| 2019/0103174 | A1 | 4/2019 | Power et al. | |
| 2019/0114341 | A1* | 4/2019 | Schukovets | G06F 16/244 |
| 2019/0361895 | A1* | 11/2019 | Weaver | G06F 16/2365 |
| 2020/0004442 | A1* | 1/2020 | Caswell | G06F 3/0659 |
| 2020/0074107 | A1* | 3/2020 | Barbas | G06F 16/24564 |
| 2020/0151169 | A1* | 5/2020 | Kalidindi | G06F 16/2455 |
| 2021/0019434 | A1* | 1/2021 | Bibliowicz | G06F 16/90335 |
| 2021/0084020 | A1* | 3/2021 | Larose | H04L 63/0807 |
| 2021/0117517 | A1* | 4/2021 | Bregman | G06N 5/01 |
| 2021/0365577 | A1* | 11/2021 | Acharya | G06F 21/629 |

OTHER PUBLICATIONS

Zhezhnych, Pavlo; Burak, Teodor; Chyrka, Oleg; "On the temporal access control implementation at the logical level of relational databases," XIth International Scientific and Technical Conference Computer Sciences and Information Technologies (CSIT), Lviv, Ukraine, 2016, pp. 84-87.*

Amazon Web Services, "Overview of Security Processes", https://media.amazonwebservices.com/pd f/AWS_Security_Whitepaper.pdf, Jun. 30, 2014, 68 pages.

International Search Report and Written Opinion, Jan. 3, 2022, PCT/US2021/048410, 12 pages.

Open Mobile Alliance (OMA), "Authorization Framework for Network APIs," OMA-ER-Autho4API-V1_0-20111130-D, No. 1.0, Nov. 30, 2011), 61 pages.

* cited by examiner

GENERATING A DATA WAREHOUSE INDEX

CROSS-REFERENCE TO RELATED APPLICATION

This is a non-provisional application for patent entitled to a filing date and claiming the benefit of earlier-filed U.S. Provisional Patent Application No. 63/073,291, Sep. 1, 2020, herein incorporated by reference in its entirety.

BACKGROUND

Field of the Invention

The field of the invention is data processing, or, more specifically, methods, apparatus, and products for generating a data warehouse index.

Description of Related Art

Modern businesses may store large amounts of data in remote databases within cloud-based data warehouses. This data may be accessed using database query languages, such as structured query language (SQL). However, constructing complex database query statements is difficult for most users. Further, frequent database requests may be computationally and financially expensive. Utilizing a second system to simplify some of these tasks may be useful. However, such a second system may require a second set of credentials in addition to the credentials required to access the cloud-based data warehouse. An identity provider may eliminate some of these issues, but implementation of identity provider accounts is not without complications.

SUMMARY

Methods, systems, and apparatus for generating a data warehouse index. Such generation of a data warehouse index may include storing, by an access manager, a refresh token for a user; obtaining, by the access manager automatically without user interaction, an access token for the user from an identity provider including providing the refresh token to the identity provider along with credentials for the access manager; submitting, by the access manager to a data warehouse, one or more queries requesting connection information for data structures of the data warehouse accessible by the user, including providing to the data warehouse the access token for authorization of the user; receiving, by the access manager from the data warehouse in response to the one or more queries, one or more responses specifying connection information for data structures of the data warehouse accessible by the user; and generating, by the access manager, an index of the data warehouse for the user based on the received connection information for data structures of the data warehouse accessible by the user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
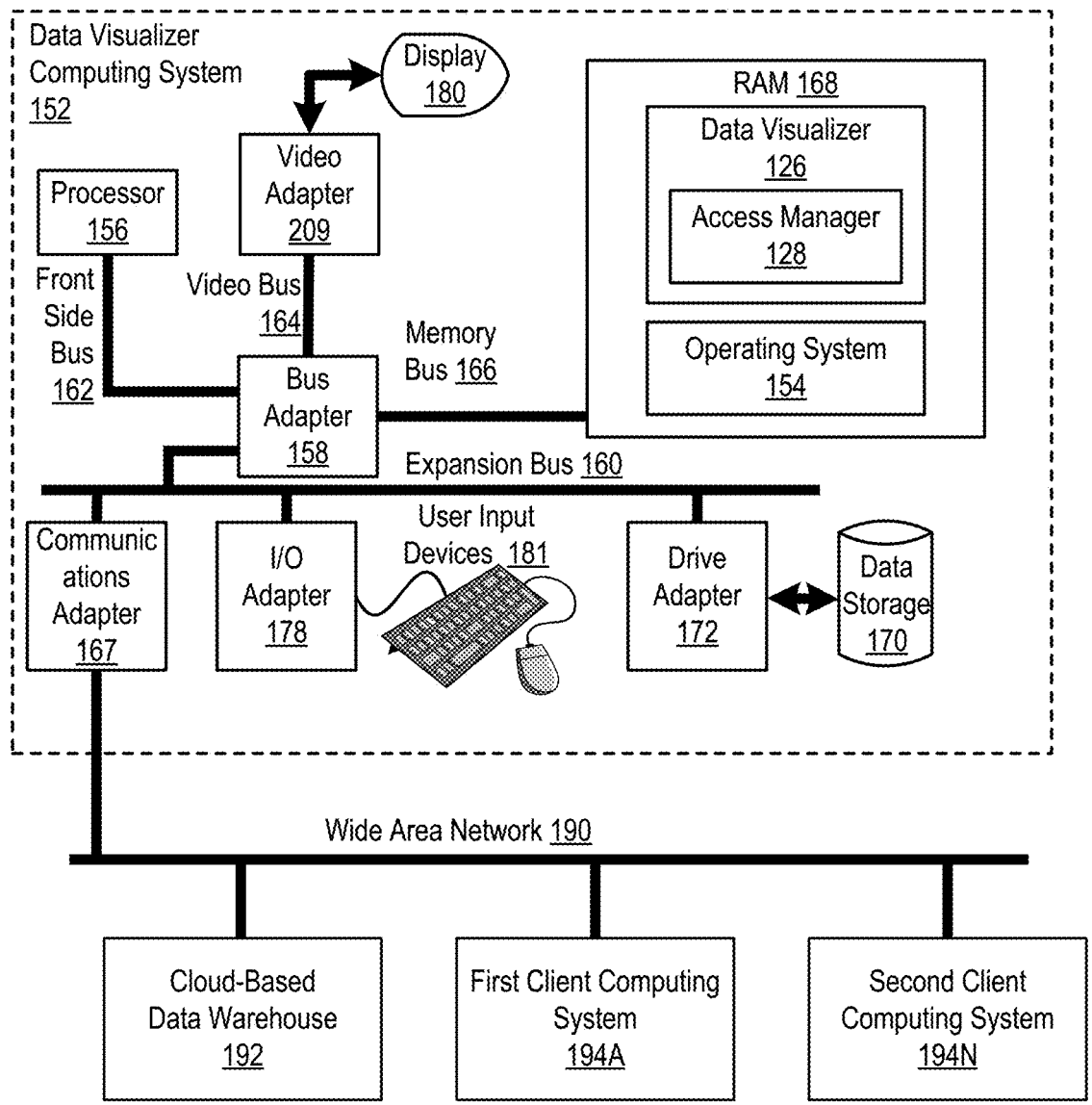
FIG. 1 sets forth a block diagram of an example system configured for generating a data warehouse index according to embodiments of the present invention.

Exemplary methods, apparatus, and products for generating a data warehouse index in accordance with the present invention are described with reference to the accompanying drawings, beginning with FIG. 1. FIG. 1 sets forth a block diagram of automated computing machinery comprising an exemplary data visualizer computing system 152 configured for generating a data warehouse index according to embodiments of the present invention. The data visualizer computing system 152 of FIG. 1 includes at least one computer processor 156 or 'CPU' as well as random access memory 168 (RAM') which is connected through a high speed memory bus 166 and bus adapter 158 to processor 156 and to other components of the data visualizer computing system 152.

Stored in RAM 168 is an operating system 154. Operating systems useful in computers configured for generating a data warehouse index according to embodiments of the present invention include Mac OS™, UNIX™, Linux™, Microsoft Windows™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is an access manager 128, modules for generating a data warehouse index according to embodiments of the present invention.

The data visualizer computing system 152 of FIG. 1 includes disk drive adapter 172 coupled through expansion bus 160 and bus adapter 158 to processor 156 and other components of the data visualizer computing system 152. Disk drive adapter 172 connects non-volatile data storage to the data visualizer computing system 152 in the form of data storage 170. Disk drive adapters useful in computers configured for generating a data warehouse index according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data visualizer computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example data visualizer computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary data visualizer computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for generating a data warehouse index according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192, a first client computing system 194A, and a second client computing system 194B. The cloud-based data warehouse 192 is a computing system or group of computing systems that hosts a database for access over the wide area network 190. The client systems (first client computing system 194A, second client computing system 194B) are computing systems that accesses the database using the access manager 128 on the data visualizer computing system 152.

Figure 2:
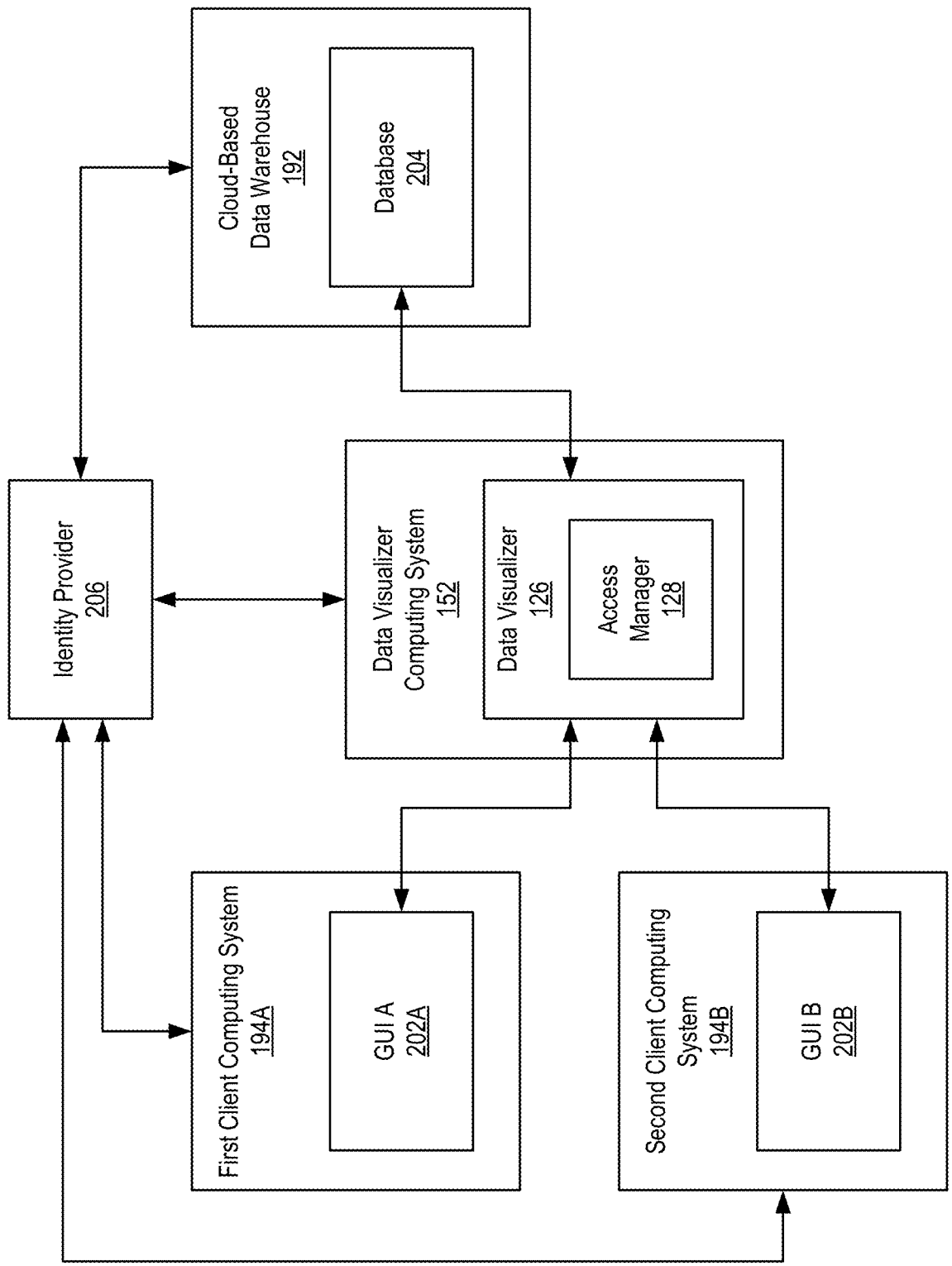
FIG. 2 sets forth a block diagram of an example system configured for generating a data warehouse index according to embodiments of the present invention.

FIG. 2 shows an exemplary system for generating a data warehouse index according to embodiments of the present invention. As shown in FIG. 2, the exemplary system includes an identity provider (IDP) 206, a data visualizer computing system 152, a first client computing system 194A, a second client computing system 194B, and a cloud-based data warehouse 192. The first client computing system 194A includes a graphical user interface (GUI) A 202A. The second client computing system 194B also includes a GUI B 202B. The cloud-based data warehouse 192 includes a database 204. The data visualizer computing system 152 includes a data visualizer 126. The data visualizer 126 includes an access manager 128.

The data visualizer 126 is an aggregation of hardware and software configured to provide data visualizations to users of the client computing systems (first client computing system 194A, second client computing system 194B). A data visualization is an abstraction of data from a database 204 on the cloud-based data warehouse 192. Specifically, a data visualization may include worksheets, graphs, or other visual elements representing data or changes in data from the database 204. A dashboard is a type of data visualization that includes a combination of visual elements. Data from the database 204 used to create a data visualization is referred to as underlying data.

The IDP 206 is a system that manages and authenticates user accounts across multiple systems, such as the data visualizer computing system 152 and the cloud-based data warehouse 192. Each system (data visualizer computing system 152, cloud-based data warehouse 192) utilizing IDP accounts may associate each account with a set of permissions and, in some cases, a role. The IDP 206 may operate, in part, by providing access tokens (in exchange for refresh tokens) that can be used to access resources, such as data visualizations and data from the database 204, under the control of the IDP account user.

In some embodiments, the IDP 206 implements an OAuth scheme. OAuth is an open standard for access delegation, commonly used as a way for Internet users to grant websites or applications access to their information on other websites but without giving them the passwords. Generally, OAuth provides clients a "secure delegated access" to server resources on behalf of a resource owner. OAuth specifies a process for resource owners to authorize third-party access to their server resources without sharing their credentials. Designed specifically to work with Hypertext Transfer Protocol (HTTP), OAuth essentially allows access tokens to be issued to third-party clients by an authorization server, with the approval of the resource owner. The third party then uses the access token to access the protected resources hosted by the resource server (e.g., the cloud-based data warehouse 192).

There are several types of tokens utilized in various OAuth schemes including, for example, access tokens and refresh tokens. Access tokens carry the necessary information to access a resource directly. In other words, when a client passes an access token to a server managing a resource, that server can use the information contained in the token to decide whether the client is authorized. Access tokens may have an expiration date and may be relatively short-lived (relative to refresh tokens). Refresh tokens carry the information necessary to obtain a new access token. In other words, whenever an access token is required to access a specific resource, a client may use a refresh token to get a new access token issued by the authentication server. Common use cases include getting new access tokens after old ones have expired or getting access to a new resource for the first time. Refresh tokens can also expire but are rather long-lived (relative to access tokens). Refresh tokens are usually subject to strict storage requirements to ensure they are not leaked. Refresh tokens can also be blacklisted by the authorization server.

The access manager 128 in the example data visualizer 126 of FIG. 2 interacts with the IDP 206 to verify and enforce authorizations and access restrictions to data visualizations and underlying data from the database 204 for each user and role. The access manager 128 may verify that a particular IDP account has access to both the data visualization as well as the underlying data from the database 204. This may include retrieving, on behalf of the IDP account user, the data from the database 204 using the IDP account user's credentials.

Each client computing system (first client computing system 194A, second client computing system 194B) is a computing system used by an IDP account user to access data visualizations presented by the data visualizer 126. The GUIs (GUI A 202A, GUI B 202B) display data visualizations to the IDP account user. The cloud-based data warehouse 192 hosts the database 204. The database 204 is a collection of data from tables and a management system for the data.

Users may be provided a view of the data warehouse stored locally at the data visualizer computing system 152. Such a view may be an index to the data warehouse that essentially identifies data structures of the data warehouse along with connections of the data warehouse. Such an index may be kept up to date by the access manager on a predefined schedule, dynamically during user downtime, or at other intervals. It may be useful to maintain such an index transparently to the user—automatically, without user interaction. To create such an index, the access manager 128 may store refresh tokens for a user authorized to access the data warehouse, utilize the refresh token to obtain from the IDP 206 an access token for the user, and utilize the access token to request connection information from the data warehouse 192. Such connection information specifies the data structures of the data warehouse 192 and the connections between the data structures. Connection information may also include metadata about the data structures, such as data labels (e.g., column names and row names).

In some embodiments, different users are granted different access rights to the data warehouse. For example, a first user may have access to all tables and a second user may only have access to only a subset of the tables. The access manager 128 may generate an index for the first user that shows connection information for all tables in the data warehouse 192 and separately create an index for the second user that shows only the connection information for the subset of tables for which the second user is authorized to access. As a more general example, users may be assigned to different roles and access control for data structures of the data warehouse may be assigned differently for each different role. In an organization with twenty users, two may be assigned to an administrator role where the administrator role has access to all data structures of the data warehouse, five may be assigned to an accounting role which has access to a first subset of tables of the data warehouse, ten may be assigned to a sales role which has access to a third subset of tables, and three may be assigned to an engineering role which has access to a fourth subset of tables. Rather than creating twenty different indexes, one for each user, the access manager may create one index for each role, where each role-specific index specifies connection information only for data structures accessible by users assigned to that particular role. In this example, the access manager may create an administrator index, an accounting index, a sales index, and an engineering index. Further, readers will recognize that users may be assigned to multiple roles.

Figure 3:
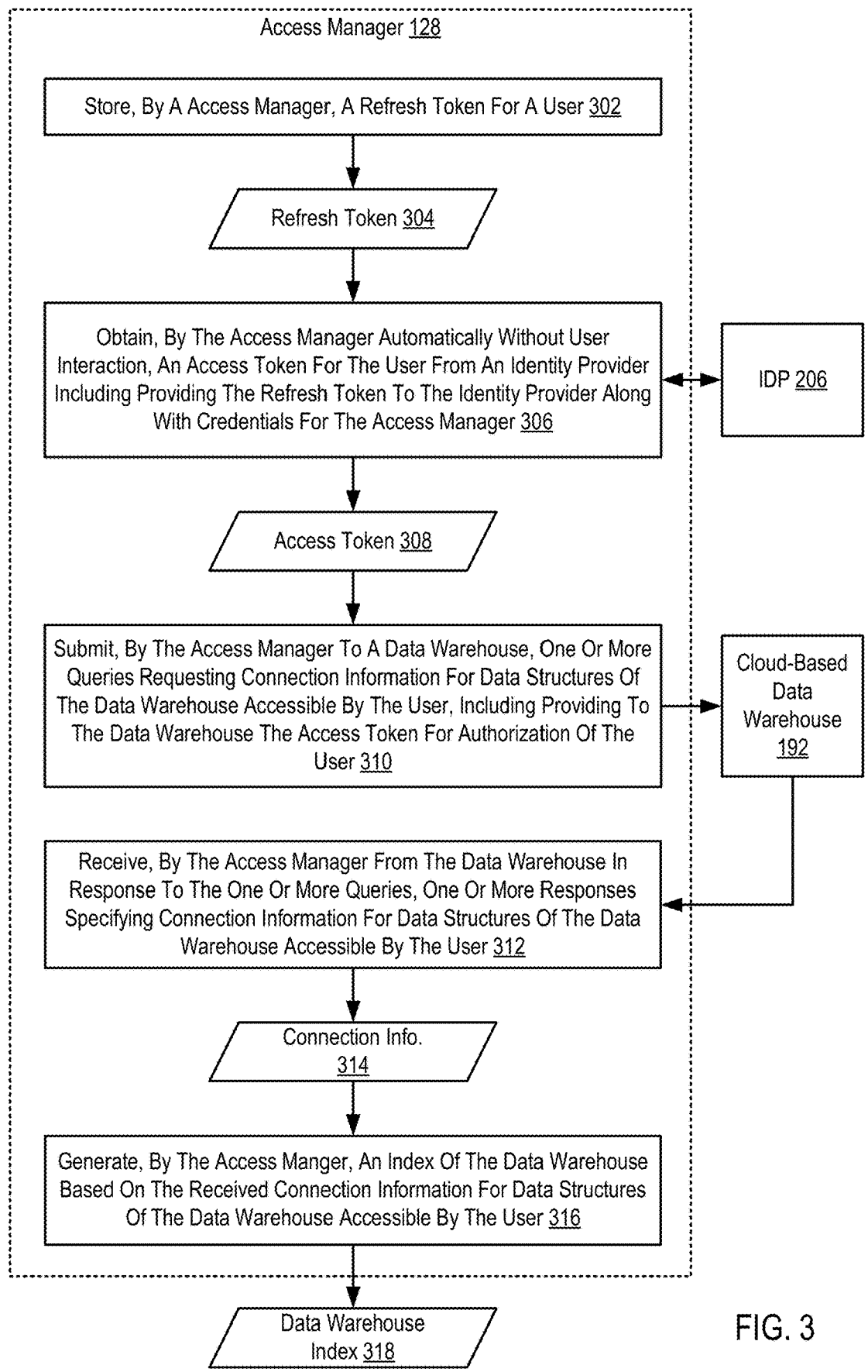
FIG. 3 sets forth a flow chart of an example method for generating a data warehouse index according to embodiments of the present invention.

For further explanation, FIG. 3 sets forth a flow chart depicting an example method of generating a data warehouse index according to embodiments of the present disclosure. The method of FIG. 3 includes storing 302, by an access manager 128, a refresh token 304 for a user. Storing 302, by an access manager 128, a refresh token 304 for a user may be carried out by receiving the refresh token 304 from the user or from an administrator, from some secure repository of refresh tokens, or from a refresh token generator (such as the IDP 206). The refresh token 304 for the user is associated with the user's access rights to the data warehouse 192. When the user requires access to data from the data warehouse for use in the data visualizer 126, the access manager 128 utilizes the user's access and/or refresh tokens to access the data warehouse 192 on the user's behalf. Such tokens are provided in this example by an identity provider 206.

The access token 308 may be unique to a user. Specifically, each access token 308 may be associated with a single user, and may be used to access the data warehouse 192 based on the users permissions within the data warehouse 192. Further, the user's permissions within the data warehouse 192 may be dependent upon the role or roles assigned to that user.

The method of FIG. 3 also includes obtaining 306, by the access manager 128 automatically without user interaction, an access token 308 for the user from an identity provider 206 including providing the refresh token 304 to the identity provider 206 along with credentials for the access manager 128. Obtaining 306, by the access manager 128 automatically without user interaction, an access token 308 for the user from an identity provider 206 including providing the refresh token 304 to the identity provider 206 along with credentials for the access manager 128 may be carried out by transferring the refresh token 304 to the IDP 206 along with a request for the associated access token 308. Obtaining 306 the access token 308 may be triggered, for example, based on a schedule or based on a combination of data visualizer computing system metrics indicating an appropriate time to initiate the index 318 generation (such as an expected period of low activity and request servicing). In some embodiments, the access manager 128 also provides its own credentials along with refresh token 304 for authorization to request an access token 308 on the user's behalf.

The method of FIG. 3 also includes submitting 310, by the access manager 128 to a data warehouse 192, one or more queries requesting connection information 314 for data structures of the data warehouse. In the method of FIG. 3, submitting 310 the queries includes providing to the data warehouse 192 the access token 308 for authorization of the user. Submitting 310, by the access manager 128 to the data warehouse 192, one or more queries requesting connection information 314 for data structures of the data warehouse may be carried out by requesting connection information 314 for each data structure to which the user is authorized to access.

Submitting 310, by the access manager 128 to the data warehouse 192, one or more queries requesting connection information 314 for data structures of the data warehouse may also be carried out by submitting a request for a role associated with the user. Specifically, a user may be associated with a role that determines which data structures within the data warehouse 192 are accessible by the user. The access manager 128 may initially request, from the data warehouse 192, the role associated with the user. Once the role is obtained, an index for that role may be generated for use by each user assigned to that role.

The method of FIG. 3 also includes receiving 312, by the access manager 128 from the data warehouse 192 in response to the one or more queries, one or more responses specifying connection information 314 for data structures of the data warehouse accessible by the user. Such connection information may specify data structures of the warehouse (accessible by the user based on permissions) along with associations between the data structures.

The method of FIG. 3 also includes generating 316 an index 318 of the data warehouse 192 based on the received connection information for data structures of the data warehouse 192 accessible by the user. Generating 316 an index 318 of the data warehouse 192 based on the received connection information for data structures of the data warehouse 192 accessible by the user may be carried out by creating the data warehouse index 318 as a searchable data structure from which connection information may be retrieved. The index can then be provided in visual form, through a GUI to the user. As mentioned above, in some instances the access manager 128 may generate a different indexes for each role to which a user can be assigned. This may be carried out by obtaining connection information 314 from the data warehouse 192 using an access token for a single user assigned to each different role. In this way, rather than creating an index for every user, the access manager may create an index for every role, greatly reducing the overall number of indexes to create.

Upon generating the index of the data warehouse, the access manager 128 may then store the generated index 318 locally on the data visualizer computing system and present the generated index 318 to the user. Presenting the generated index 318 to the user may include receiving a search query from the user and generating data warehouse queries based on the received search query and the generated index. Specifically, data warehouse queries may be generated using input from the user along with information from the index 318. For example, if a user wants to search all accessible data structures in the data warehouse 192 for a particular value, a query may be generated that includes the requested value that targets each data structure listed in the index 318. As another example, if a user requests data from the data warehouse 192 that exists in the index 318, then the access manager may avoid sending a database request to the data warehouse 192 by servicing the request using only the locally-stored index 318.

Figure 4:
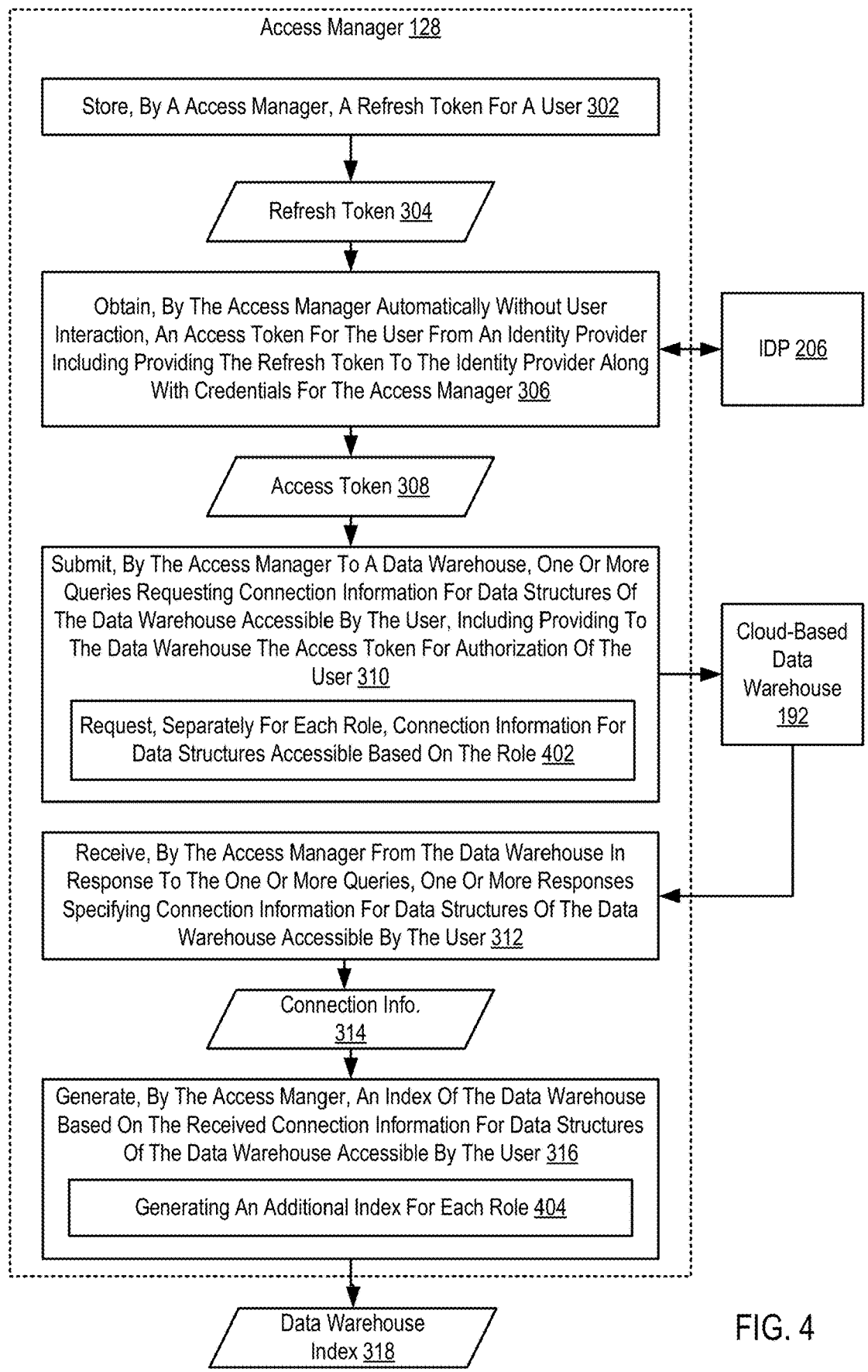
FIG. 4 sets forth an additional flow chart of an example method for generating a data warehouse index according to embodiments of the present invention.

For further explanation, FIG. 4 sets forth a flow chart depicting an example method of generating a data warehouse index according to embodiments of the present disclosure. Similar to FIG. 3, the method of FIG. 4 includes storing 302, by an access manager 128, a refresh token 304 for a user; obtaining 306, by the access manager 128 automatically without user interaction, an access token 308 for the user from an identity provider 206 including providing the refresh token 304 to the identity provider 206 along with credentials for the access manager 128; submitting 310, by the access manager 128 to a data warehouse 192, one or more queries requesting connection information 314 for data structures of the data warehouse; receiving 312, by the access manager 128 from the data warehouse 192 in response to the one or more queries, one or more responses specifying connection information 314 for data structures of the data warehouse accessible by the user; and generating 316 an index 318 of the data warehouse 192 based on the received connection information for data structures of the data warehouse 192 accessible by the user.

The method of FIG. 4 differs from the method of FIG. 3 in that submitting 310, by the access manager 128 to a data warehouse 192, one or more queries requesting connection information 314 for data structures of the data warehouse includes requesting 402, separately for each role, connection information for data structures accessible based on the role. As discussed previously, access to the data structure of the data warehouse 192 may be controlled based on the roles to which a user is assigned. Requesting 402, separately for each role, connection information for data structures accessible based on the role may be carried out by reconnecting with the data warehouse 192 with each unique role assigned to the user and submitting queries for the connection information 314 associated with each role. The access manager 128 may utilize the same access token 308 but communicate to the data warehouse 192 that the particular queries are submitted through a particular role.

The method of FIG. 4 also differs from the method of FIG. 3 in that generating 316 an index 318 of the data warehouse 192 based on the received connection information for data structures of the data warehouse 192 accessible by the user includes generating 404 an additional index for each role. Generating 404 an additional index for each role may be carried out by using the role-specific connection information 314 to create a searchable data warehouse index of the data structures and connections accessible by the user via the selected role.

Upon generating 404 an additional index for each role, the access manager 128 may then store the additional index for each role and present, to a subsequent user upon request, the additional index for the role assigned to the subsequent user. For example, a second user associated with the same role as the first user may access the data visualizer and request data from the data warehouse 192. Instead of generating a new index for the second user, the access manager 128 may translate the request into database queries using the information received in the request along with connection information 314 from the index 318 for the role shared by the first user and the second user.

Exemplary embodiments of the present invention are described largely in the context of a fully functional computer system for generating a data warehouse index. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of generating a data warehouse index, the method comprising:
    obtaining, from an identity provider by an access manager automatically without user interaction, an access token for a user of a client computing system responsive to providing a refresh token for the user along with credentials for the access manager to the identity provider, wherein access to data structures of a data warehouse is controlled based on roles to which a user is assigned;
    submitting, by the access manager to a data warehouse, one or more queries requesting connection information for data structures of the data warehouse accessible by the user, including:
        providing to the data warehouse the access token for authorization of the user;
        retrieving at least one role associated with the user; and
        requesting, separately for each role associated with the user, connection information for data structures accessible based on the role;
    receiving, by the access manager from the data warehouse in response to the one or more queries, one or more responses specifying connection information for data structures of the data warehouse accessible by the user; and
    generating, by the access manager, a separate index of the data warehouse for each role of the user based on the received connection information for data structures of the data warehouse accessible by the user, wherein the index lists data structures of the data warehouse accessible by each user of a particular role, wherein each of the access manager, the identity provider, the data warehouse and the client computing system are separate computing systems coupled via a wide area network.

2. The method of claim 1, further comprising:
storing, by the access manager, the generated indexes; and
presenting the generated indexes to the user.

3. The method of claim 2, wherein presenting the generated index to the user comprises:
receiving a search query from the user; and
generating data warehouse queries based on the received search query and the generated indexes.

4. The method of claim 1, further comprising:
storing, by the access manager, the separate indexes for each role; and
presenting, to a subsequent user upon request, the index for the role assigned to the subsequent user.

5. The method of claim 1, wherein the user is associated with more than one role.

6. The method of claim 1, wherein submitting, by the access manager to the data warehouse, the one or more queries requesting connection information for the data structures of the data warehouse accessible by the user comprises submitting a request for the roles associated with the user.

7. The method of claim 1, wherein the connection information comprises the data structures of the data warehouse and connections between the data structures.

8. The method of claim 1, wherein the refresh token is unique to the user.

9. An apparatus for generating a data warehouse index, the apparatus comprising a computer processor, a computer memory operatively coupled to the computer processor, the computer memory having disposed within it computer program instructions that, when executed by the computer processor, cause the apparatus to carry out the steps of:
obtaining, from an identity provider by an access manager automatically without user interaction, an access token for a user of a client computing system responsive to providing a refresh token for the user along with credentials for the access manager to the identity provider, wherein access to data structures of a data warehouse is controlled based on roles to which a user is assigned;
submitting, by the access manager to a data warehouse, one or more queries requesting connection information for data structures of the data warehouse accessible by the user, including:
providing to the data warehouse the access token for authorization of the user;
retrieving at least one role associated with the user; and
requesting, separately for each role associated with the user, connection information for data structures accessible based on the role;
receiving, by the access manager from the data warehouse in response to the queries, one or more responses specifying connection information for data structures of the data warehouse accessible by the user; and
generating, by the access manager, a separate index of the data warehouse for each role of the user based on the received connection information for data structures of the data warehouse accessible by the user, wherein the index lists data structures of the data warehouse accessible by each user of a particular role, wherein each of the access manager, the identity provider, the data warehouse and the client computing system are separate computing systems coupled via a wide area network.

10. The apparatus of claim 9, further comprising:
storing, by the access manager, the generated indexes; and
presenting the generated indexes to the user.

11. The apparatus of claim 10, wherein presenting the generated index to the user comprises:
receiving a search query from the user; and
generating data warehouse queries based on the received search query and the generated indexes.

12. The apparatus of claim 9, further comprising:
storing, by the access manager, the separate indexes for each role; and
presenting, to a subsequent user upon request, the index for the role assigned to the subsequent user.

13. The apparatus of claim 9, wherein the user is associated with more than one role.

14. The apparatus of claim 9, wherein submitting, by the access manager to the data warehouse, the one or more queries requesting connection information for the data structures of the data warehouse accessible by the user comprises submitting a request for the roles associated with the user.

15. The apparatus of claim 9, wherein the connection information comprises the data structures of the data warehouse and connections between the data structures.

16. The apparatus of claim 9, wherein the refresh token is unique to the user.

17. A computer program product for generating a data warehouse index, the computer program product disposed upon a non-transitory computer readable medium, the computer program product comprising computer program instructions that, when executed, cause a computer to carry out the steps of:
obtaining, from an identity provider by an access manager automatically without user interaction, an access token for a user of a client computing system responsive to providing a refresh token for the user along with credentials for the access manager to the identity provider, wherein access to data structures of a data warehouse is controlled based on roles to which a user is assigned;
submitting, by the access manager to a data warehouse, one or more queries requesting connection information for data structures of the data warehouse accessible by the user, including:
providing to the data warehouse the access token for authorization of the user;
retrieving at least one role associated with the user; and
requesting, separately for each role associated with the user, connection information for data structures accessible based on the role;
receiving, by the access manager from the data warehouse in response to the queries, one or more responses specifying connection information for data structures of the data warehouse accessible by the user; and
generating, by the access manager, a separate index of the data warehouse for each role of the user based on the received connection information for data structures of the data warehouse accessible by the user, wherein the index lists data structures of the data warehouse accessible by each user of a particular role, wherein each of the access manager, the identity provider, the data warehouse and the client computing system are separate computing systems coupled via a wide area network.

* * * * *